Oct. 10, 1967     J. E. SLINKARD ETAL     3,346,705

ELECTRIC CORD REEL APPARATUS

Filed Feb. 28, 1964     2 Sheets-Sheet 1

INVENTOR.
JAMES E. SLINKARD
BY
Robert E. Breidenthal
ATTORNEY

INVENTOR.
JAMES E. SLINKARD
BY Robert E Breidenthal
ATTORNEY 3,346,705
ELECTRIC CORD REEL APPARATUS
James E. Slinkard, Independence, Kans., assignor to Robert E. Breidenthal, Wichita, Kans.
Filed Feb. 28, 1964, Ser. No. 348,072
8 Claims. (Cl. 191—12.4)

This invention relates to new and useful improvements in electric cord reels, and more particularly pertains to reels of such type specially adapted for axial compactness and ease of assembly and replacement of or change of spring tension on the electric cord.

Many types of electric cord reels have heretofore been proposed such as exemplified by the disclosures presented in the following United States patents:

No. 1,591,901 issued July 6, 1926, to Watts
No. 1,599,124 issued Sept. 7, 1926, to Fisler
No. 1,888,258 issued Nov. 22, 1932, to Bettinger
No. 1,936,085 issued Nov. 21, 1933, to Grant
No. 2,159,004 issued May 23, 1939, to Bosch
No. 2,270,997 issued Jan. 27, 1942, to Davis
No. 2,606,979 issued Aug. 12, 1952, to Ringstad
No. 2,514,628 issued July 11, 1950, to Cortes Since prior proposals have in their execution been found generally to be subject to one or more disadvantages in the nature of excessive size either in diameter or more especially in axial extent, excessive cost of manufacture, difficulty in making repairs, replacements or adjustments, or in subjecting either the electric cord wound on the reel or the supply conductors to excessive wear resutling in short equipment life and/or subjecting the user to electrical shock hazards.

The primary object of the present invention is to avoid or greatly diminish all the disadvantages mentioned above, and to produce an electric cord reel apparatus that is light in weight, durable, and very flexible in the types of utilization to which it may be put.

An important object of the invention in accordance with the above principal object is to provide a reel apparatus comprised of few easily and inexpensively manufactured parts that can be readily and easily assembled with little if any need for the use of special tools or skills.

Another important object of the invention is to produce an electric cord reel apparatus in which the excellent electrical insulation characteristics of synthetic resins as well as the low friction characteristics of such materials can be most conveniently taken advantage.

Still another important object of the present invention is to provide an electric cord reel apparatus in which the electric cord can be readily disconnected from the reel both electrically and mechanically, and with no tools being necessary whatever in making or releasing such mechanical and electrical connection.

Still another object of the invention is to provide an electric cord reel construction wherein a substantially uniform amount of attention on the electric cord is required to dispense cord from the reel without regard to the amount of cord wound on the reel.

One broad aspect of the invention comprises a reel mounted for rotation on a frame, said reel including a hub and a female electric socket carried by said hub adapted to releasably receive and make electrical connection with an electric cord male plug, a plurality of electric terminals insulated from each other carried by the frame and said female socket including a corresponding number of electric contacts insulated from each other, and means including a rotary electrical coupler electrically connecting each one of the terminals to separate ones of said electric contacts, whereby an electric cord can be releasably connected mechanically and electrically to the reel and wound on the latter with electrical energy available at said terminals being delivered to such electric cord.

A more limited aspect of the invention comprises providing the structure defined in the preceding paragraph with a set of electric conductors connected to the set of terminals, and additionally providing a combined means for mounting the frame on a suitable support and for protecting the electric conductors adjacent the frame, such combined means comprising an E-shaped bracket including spaced upper, intermediate and lower flanges, said upper flange being secured to the frame with the electric conductors extending therethrough and thence laterally from the E-shaped bracket intermediate the upper and intermediate flanges, and a clamping screw through the lower flange for clampingly engaging a suitable support intermediate the clamping screw and the intermediate flange.

Another broad aspect of the invention comprises a reel mounted for rotation on a frame, said reel including a hub, an electric cord having one end thereof wound upon said hub, a first set of electric terminals insulated from each other and carried by the hub with said electric cord including an equal number of electric conductors insulated from each other, a single electric male plug and female socket means releasably connecting mechanically and electrically each one of the first set of terminals to seperate ones of the electric conductors, whereby all of the electric conductors can jointly be mechanically and electrically released from the first set of terminals to free the electric cord from the hub of the reel, a second set of electric terminals carried by the frame and insulated from each other and equal in number to the first set of terminals, and means including a rotary electrical coupler electrically connecting each one of the second set of terminals to separate ones of the first set of terminals, whereby electrical energy supplied to the second set of terminals is delivered to the electric conductors of the electric cord when such conductors are electrically connected to the first set of terminals by said plug and socket means.

Still another aspect of the invention relates to the improvement in an electric cord reel construction comprising a housing including a separable first and second sections, said first section comprising a substantially circular first wall having a central opening, said second section comprising a substantially circular second wall spaced parallel to the first wall, said walls having peripheral flanges directed generally toward each other to define jointly with said walls a substantially cylindrical hollow interior of the housing, said first wall having a re-entrant, generally tubular portion about the opening and extending into the housing, means coaxial with the tubular portion of the first wall and the second wall releasably connecting such tubular portion and the second wall to releasably secure the walls in assembled relation, a reel mounted for rotation in the housing about an axis coincident with the axis of said tubular portion of said first wall, a pair of electric contactor rings insulated from each other and mounted on the tubular portion of the first wall, a pair of insulated electric conductors projecting into said opening from outside the housing and connected to the contactor rings, a pair of electric contactor fingers carried by the reel and in sliding electrical engagement with the rings, an electric cord wound on the reel having a pair of insulated electric conductors therein, means electrically connecting the last-mentioned conductors to the fingers, said housing having an opening jointly defined by said flanges through which the electric cord extends from the housing, and a spring motor coiled about the tubular portion of the first wall intermediate the reel and the first wall and operatively biasing rotation of the reel relative to the housing to urge winding of the electric cord about the reel.

Other objects, features, aspects and advantages of the invention will become apparent during the following description of a preferred embodiment of the invention, such following description to be taken in conjunction with the accompanying drawings, wherein.

Figure 1:
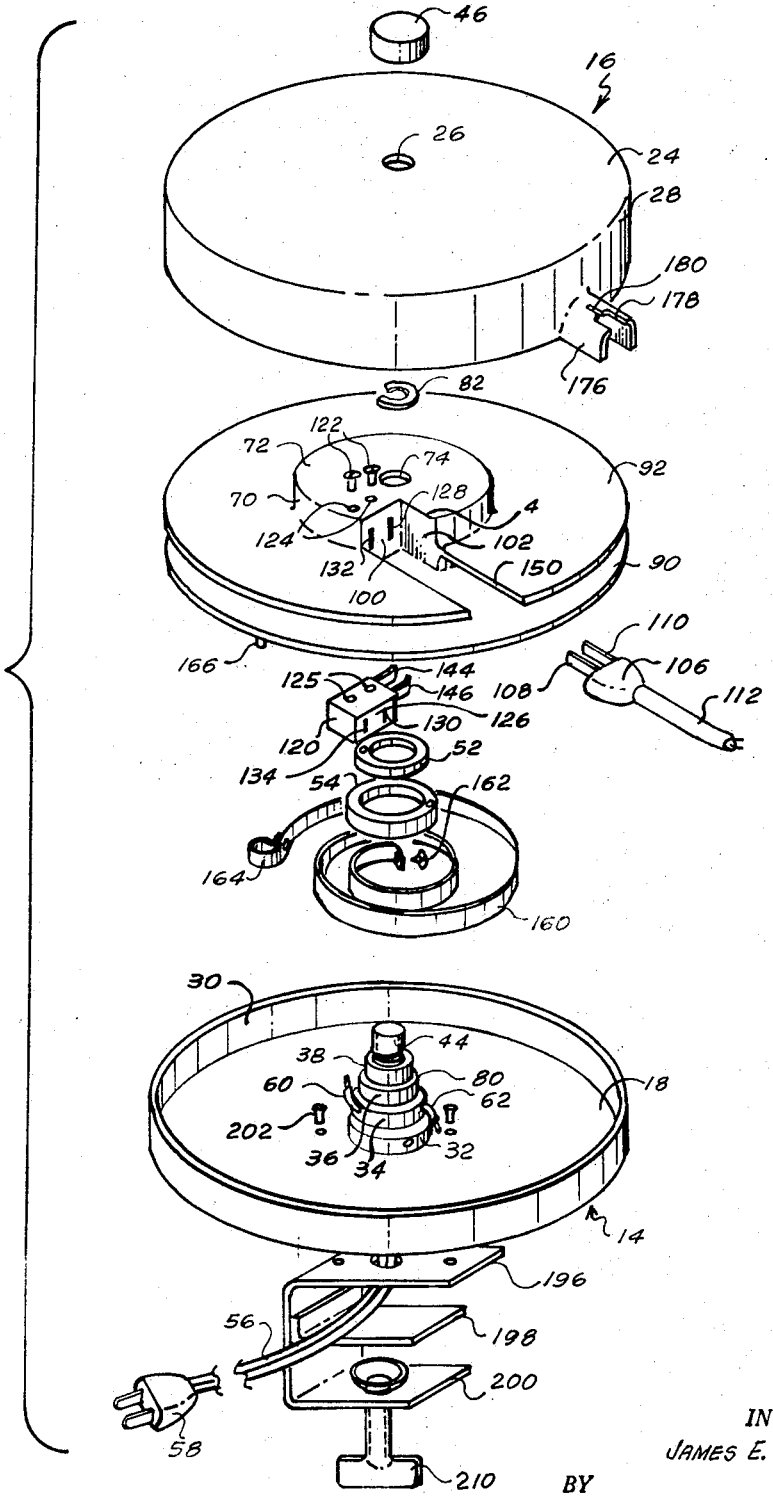
FIGURE 1 is an exploded isometric view of the preferred embodiment of an electric cord reel construction according to the invention.
Figure 3:
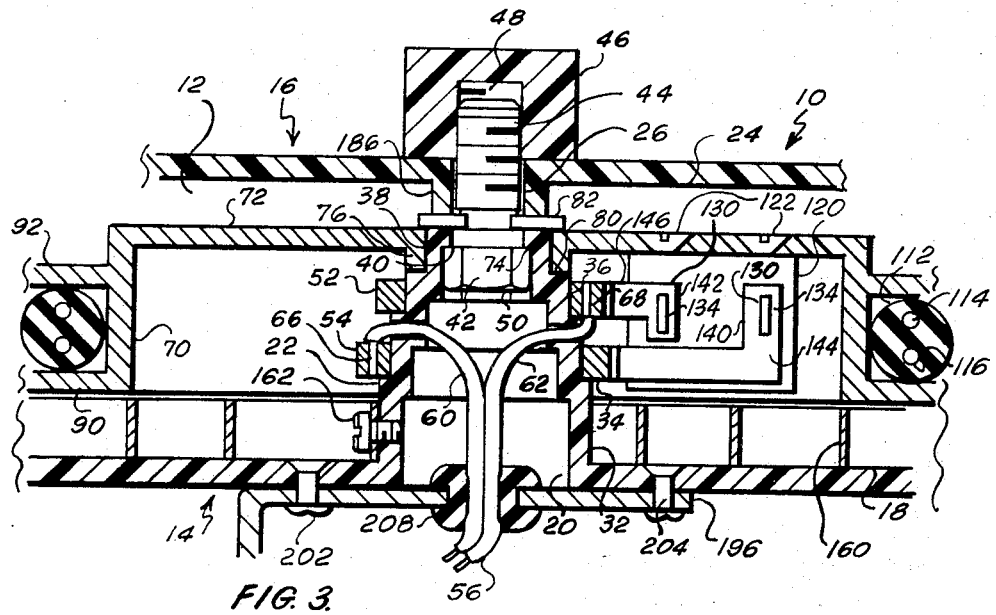
FIGURE 3 is an enlarged central vertical sectional detail view of the structure shown in FIGURE 2 and taken upon the same plane.

Referring now to the drawings, wherein like reference numerals refer to similar parts throughout the various views, the reference numeral 10 designates the electric cord reel construction generally.

A housing having a generally cylindrical hollow interior 12 is comprised of two separable sections designated generally at 14 and 16. The housing section 14 consists of a generally circular end wall 18 having a central opening 20. The end wall 18 includes a re-entrant, generally tubular wall portion 22 that is concentric with and surrounds the opening 20. The housing section 16 is comprised of a generally circular end wall 24 of slightly greater diameter than the end wall 18, and the end wall 24 is provided with a central opening 26 that is in axial alignment with the opening 20 and the tubular portion 22 of the end wall 18.

The housing section 16 includes a peripheral flange 28 that extends toward but stops short of the plane defined by the end wall 18, it being noted that the end walls 18 and 24 are each substantially planar and spaced in parallel from each other. The end wall 18 includes a peripheral flange 30 that extends toward the end wall 24 to overlap slightly the flange 28 and to be received slidingly within the substantially annular extreme extent of the flange 28, whereby the hollow interior 12 of the housing is substantially sealed against ingress of airborne foreign matter such as would possibly adversely affect the mechanical and electrical operation of components disposed within the housing subsequently to be described.

Preferably, the end wall 18, the re-entrant tubular portion 22 of the end wall 18, and the flange 30 are of integral construction, and such elements are preferably constructed of an electrically insulating material such as a thermoplastic or thermosetting plastic material. Such integrally constructed elements may, for example, be conveniently made by conventional molding techniques of Bakelite, polystyrene, Lucite, nylon, polyethylene, or polytetrafluoroethylene (such as sold under the trademark "Teflon"). Materials such as nylon, polyethylene and polytetrafluoroethylene are especially preferred because in addition to their excellent electrical insulation characteristics, such materials possess very low coefficients of friction with respect to metals or other synthetic resins of such character.

Similarly, the housing section comprised of the end wall 24 and the flange 28 is preferably of integral construction and preferably is also made of materials such as previously indicated suitable for the end wall 18, the tubular portion 22 and the flange 30.

The re-entrant, tubular portion 22 of the end wall 18 is of stepped construction, diminishing stepwise in external and internal diameter from the end wall 18 toward the end wall 24 to define in sequence from the end wall 18 a first circular cylindrical section 32 of maximum diameter, a second circular cylindrical section 34 of intermediate external diameter, a third circular cylindrical section 36 of still further reduced intermediate external diameter, and a final circular cylindrical section 38 of minimum external diameter. It is not strictly essential that the sections 32, 34, 36 and 38 be absolutely cylindrical, and can if desired be somewhat tapered to afford draft to facilitate fabrication by molding or casting techniques as will be evident to those conversant with the art.

Figure 2:
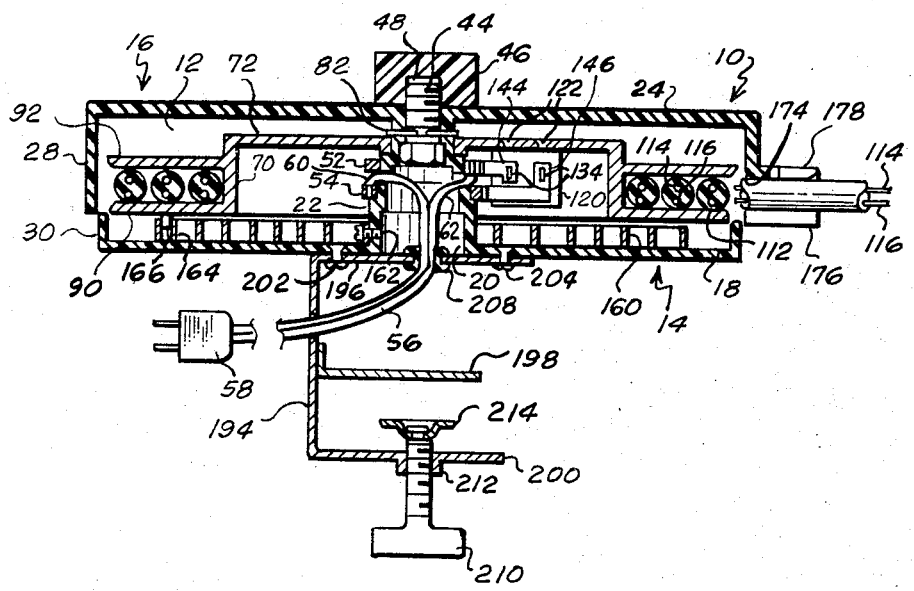
FIGURE 2 is a central vertical sectional view of the embodiment of the invention shown in FIGURE 1.

An internal shoulder 40 is defined adjacent the juncture of the sections 36 and 38, and the head 42 of a threaded bolt 44 (which can be metal or of a suitable synthetic rein) is seated against such shoulder 40, such bolt 44 extending through the opening 26 in the end wall 24 and being secured by a nut 46 threaded on the bolt 44. The nut 46 is preferably made of an electrically insulating material such as are the housing sections 14 and 16, and the bolt 44 is threadingly received within an internally threaded blind opening 48 in the nut 46. The head 42 of the bolt 44 is polygonal in configuration, and the interior of the tubular portion 22 of the end wall 18 is of a complementary configuration within the section 38 thereof as indicated at 50 to prevent rotation of the bolt 44 when positioned as shown in FIGURE 2. This arrangement facilitates tightening of the nut 46 on the bolt 44 to seat the nut 46 against the outer side of the end wall 24. As will be seen, the bolt 44 and the nut 46, when the latter is tight, releasably retain the housing sections 14 and 16 in assembled relation and prevent relative rotation of the housing sections 14 and 16 except on intentionally unscrewing the nut 46. If desired a lock washer, not shown, can be disposed on the bolt between the nut 46 and the wall 24 to more positively prevent relative rotation of the sections 14 and 16.

For a purpose to become apparent, a pair of electrically conductive contactor rings or annular copper members 52 and 54 are respectively press fitted on the sections 36 and 34 of the re-entrant tubular portion 22 of the end wall 18. An electric supply cable 56 is provided having a male plug 58 at one end by means of which insulated electric conductors 60 and 62 insulated from each other within the cable 56 can be conveniently coupled to electrical supply means, not shown. The electric supply cable 56 extends into the opening 20, and the insulated electrical conductors 60 and 62 extend radially through suitable openings in the tubular portion 22 intermediate the rings 52 and 54 and the conductors are respectively electrically and mechanically connected to the contactor rings 54 and 52 by being soldered in lateral openings 66 and 68 in the latter. In this manner, electrical potentials (A.C. or D.C., as may be the case) are supplied to the contractor rings 52 and 54, it being understood that the external configuration of each of the contactor rings 52 and 54 is circular and preferably cylindrical.

A reel construction is mounted for rotation within the interior 12 of the housing, such reel construction comprising a hollow hub structure 70 that is cylindrical except to the extent subsequently to be described. The upper end of the hub structure 70 is closed by an end wall 72 that is provided with a central opening 74. The opening 74 is in coaxial alignment with the openings 26 and 20, and the wall 72 includes a depending flange or rib 76 surrounding the opening 74, and such rib or flange 76 is journaled for rotation upon the circular cylindrical section 38 of the re-entrant tubular portion 22 of the end wall 18. The annular extremity of the rib or flange 76 remote from the wall 72 bears against an external shoulder 80 on the tubular portion 22 adjacent the juncture of the sections 36 and 38, thereof, and to facilitate assembly of the apparatus, a split ring spring 82 of resilient character is removably and clampingly engaged about the bolt 44. The split ring spring 82 is positioned on the bolt 42 to seat against the extremity of the tubular portion 22 remote from the end wall 18. The external diameter of the split ring spring 82 is greater than that of the section 38 of the tubular portion 22 and seats against the wall 72 so as to retain the hub wall 72 journaled on the section 38 of the tubular portion 22. Like the bolt 44, the split ring spring 82 can be either metal (steel, or the like), but is preferably a synthetic resin. Whereas the blot 44 can conveniently be made of nylon, it is especially preferred that the split ring spring 82 be made of a material having at least a modest degree of resiliency and particularly such as to have a low coefficient of friction with the material of which the hub wall 72 is made. With respect to the last-mentioned desideratum, the split ring spring 82 can be nylon or polytetrafluoroethylene (such as marketed under the trademark "Teflon") as such substances, especially the latter, have low coefficients of friction with metals as well as with quite a few of the types of synthetic resins of which the hub wall 72 and the flange 76 thereof may be made. Alternatively, the spring 82 can be metallic with an annular bearing washer of low coefficient of friction synthetic resin (not shown) interposed between the spring 82 and the elements 22 and 72.

While the hub wall 72 and the flange or rib 76 thereof are sectioned in FIGURE 2 as being metallic (steel, or zinc alloy suitable for fabrication by die casting, being suitable), such structural elements can conveniently be molded by conventional techniques from such synthetic resins as those previouly indicated as suitable for the housing sections 14 and 16, it being noted that such substances afford good bearing characteristics such as are desirable with respect to the sliding engagement had with the tubular portion 22 and the split ring spring 82.

The reel construction includes a pair of parallel, radially extending flanges 90 and 92 on the hollow hub 70, it being noted that the flanges 90 and 92 are preferably integral with the hollow hub 70, and are of course formed of the same material as the hollow hub 70, the wall 72 and the rib or flange 76. The flange 90 is positioned at the lower extremity of the hollow hub 70, and it will be noted that the flange 90 is spaced from the end wall 18 and has a radial extent such as to terminate in a circular configuration adjacent the juncture of the flanges 28 and 30 on the end walls 24 and 18. It should also be noted that the hollow vertical extent of the hub 70 is such as to surround or encompass the sections 34 and 36 of the re-entrant tubular portion 22 of the end wall 18 on which the contact rings 54 and 52 are respectively disposed. The flange 92 is vertically spaced from the flange 90 and is positioned on the hub 70 at a position intermediate the vertical extent of the latter. As will be seen presently, the vertical spacing of the flanges 90 and 92 is preferably such as to be just slightly greater than the diameter of the electric cord to be wound on the hub 70 intermediate the flanges 90 and 92, and it is especially preferred that the vertical spacing of the flanges 90 and 92 not be as great as twice the diameter of such electric cord so that each layer of cord winding will consist of not more than one turn of the cord about the reel construction. Except as pointed out hereinafter, the flange 92 has a circular periphery of substantially the same diameter as the circular periphery of the flange 90 and terminates in spaced relation to the flange 28 of the end wall 24. Despite the preferences expressed as to the spacing of the flanges, it will be apparent that beneficial results can be realized even when a winding cord of a diameter less than half such spacing is used.

As pointed out hereinbefore, the hollow hub 70 is substantially cylindrical in configuration; however, the same has, as clearly shown in FIGURE 1, a dihedrally shaped indentation (the dihedral angle of such configuration being defined by intersecting hub surfaces 100 and 102) to constitute an external notch or recess 104 in the hollow hub 70 that extends the entire axial extent of the hub 70 except to the extent that the flange 90 joins with the hub walls or surfaces 100 and 102. The walls or surfaces 100 and 102 define a dihedral angle of approximately 90° and such dihedral angle is preferably oriented in such a manner that a bisecting plane thereof includes the axis of the opening 74 or passes in the near vicinity of the axis of the opening 74. In any event it is preferred that the plane defined by the wall or surface 100 be oriented in such a manner as to be spaced from the axis of the opening 74 and such that a line perpendicular to such plane and intersecting the approximate center of such wall 100 be spaced from the axis of the opening 74. The size of the notch or recess 104 is approximately such as to define a volume in conjunction with a circular cylinder conformable with the remaining external surface of the hub 70 to contain a male plug 106 (excluding the electrically conductive male prongs or pins 108 and 110 of such male plug 106) of a multiple conductor, insulated and flexible electric cord 112. As will be appreciated, the flexible electric cord 112 includes electric conductors 114 and 116 that are electrically insulated from each other and the external surface of the cord 112, and such electric conductors 114 and 116 are respectively electrically connected within the male plug 106 to the male prongs or pins 108 and 110. The male plug 106 including the pins or prongs 108 and 110 thereof is entirely of conventional character and is preferably such that the male pins or prongs 108 and 110 thereof are such as to not only make electric connections with the electric contacts of conventional female sockets but also such as to frictionally engage and/or releasably mechanically interlock with such contacts as to make a mechanical connection with such contacts of the female socket as can only be broken by the application of substantial mechanical force on the male plug 106 to withdraw the pins or prongs 108 and 110 from such conventional female socket, all of which will be well understood by those skilled in the art.

A female socket structure 120 is positioned within the hub 120 and secured thereto by screws 122 extending through apertures 124 in the hub wall 72 and threaded into internally threaded apertures 125 provided in the socket structure 120. The socket structure 120 includes a wall 126 that is seated against the inner side of the hub wall 100, and the walls 100 and 126 are provided with aligned openings 128 and 130 through which the male pin or prong 110 is removably received in such an arrangement that the prong or pin 110 extends into the female socket device 120. Similarly, the walls 100 and 126 are provided with aligned openings 132 and 134 through which the male prong or pin 108 is removably received to extend into the female socket device 120.

Within the female socket device 120, the male pins or prongs 108 and 110 mechanically and electrically engage apertured metallic contacts 140 and 142, respectively, that are fixedly secured within the female socket device 120 by any suitable means. The electric contacts 140 and 142 are in turn respectively connected electrically to resilient electric contactor fingers 144 and 146 that respectively extend toward and are biased in sliding engagement against the contactor rings 54 and 52, respectively. The electric contact fingers 144 and 146 can be conveniently made of a conventional alloy of beryllium and copper used in electrically conductive spring art.

As thus far described, it will be appreciated that when the male plug 106 is plugged into the female socket device 120, an electrical connection is established between the electric conductor 60 of the supply cable 56 and the electric conductor 114 of the electric cord 112. Similarly, electrical connection is established between the electric conductor 62 of the cable 56 and the electric conductor 116 of the electric cord 112. Similarly, electrical connection is established between the electric conductor 62 of the supply cable 56 and the electric conductor 114 of the electric cord 112. Also, as a consequence of the size and position of the recess 104 in relation to the male plug 106, the latter is received within the recess 104 in such a manner that the male plug 106 together with the external surface of the reel hub 70 constitutes a generally over-all cylindrical surface around which the electric cord 112 can be smoothly wound within the flanges 90 and 92.

In order to facilitate making operative electrical and mechanical connection between the male plug 106 and the female socket device 120, the flange 92 is provided with an elongated slot 150 extending from the surface 100 to the periphery of the flange 92, it being noted that the slot 150 is substantially of the same width as the hub wall 100 and extends longitudinally in a direction perpendicular to the wall 100. With this arrangement, finger access to the male plug 106 is greatly facilitated whereby manual mechanical and electrical connection or disconnection of the electric cord 112 with respect to the reel construction can be readily effected.

A coiled spring motor 160 is provided for biasing rotation of the reel construction toward a neutral position such as to tend to cause the electric cord 112 to wind upon the reel hub 70. As clearly shown in FIGURE 2, the spring motor 160 can conveniently be of the same general spiral form and made of the same class of materials as are the conventional mainsprings of mechanical clocks. The spring motor 160 is positioned within the housing defined by the housing sections 14 and 16 intermediate the end wall 18 and the flange 90 of the reel construction. The innermost end of the spring motor 160 is fixedly secured to the section 32 of the tubular portion 22 by means of a screw 162. The outermost end of the spring motor 160 is formed as a loop 164 in which is received a downwardly projecting pin 166 carried by and preferably integrally formed with the flange 90. Thus, a resilient connection is established between the housing and the reel construction such that a torque tending to cause rotation of the reel construction relative to the housing may be established.

The spring motor 160 is tensioned so that the electric cord 112 is wound outwardly upon the hub 70 intermediate the flanges 90 and 92 in an anticlockwise direction as viewed from the top, and the unwound portion of the electric cord 112 extends from the housing through an opening 174 defined between opposed edges of the flanges 28 and 30. The opening 174 has a vertical height and lateral extent generally corresponding to the spacing of the flanges 90 and 92 and is vertically positioned in alignment with the space between the flanges 90 and 92. Means is provided on the flange 28 for guiding the electric cord 112 for a short distance radially outward from the housing, such means comprising a U-shaped projection 176 on and integral with the flange 28, the same being positioned to encompass the upper part of the opening 174, and such projection 176 opens downwardly as clearly shown in the drawings. Means is provided for releasably restraining the electric cord 112 against retraction into the housing as caused by the spring motor 160 applying torque to the reel construction. Such restraining means comprises a slot 178 in the bight or web portion of the extremity of the projection 176, such slot 178 having a transverse dimension in repose slightly less than the external diameter of the electric cord 112. The arrangement is such that the electric cord 112 extending outwardly from the projection 176 can be raised whereupon the electric cord 112 is guided by the opposed sides and bight portion of the projection 176 into the slot 178, it being understood that inherent resiliency of the material of which the projection 176 is made will flex sufficiently to allow the electric cord 112 to move into and wedge in the slot 178 and be snugly though releasably clamped within the slot 178 with sufficient force to prevent or frictionally lock the electric cord 112 against retraction by the spring motor 160 into the housing defined by the sections 14 and 16. Since the material selected for the housing section 16, flange 28 and projection 176 may be of such stiffness as to make introduction of the electric cord 112 into the slot 178 difficult, the bite portion of the projection 176 may be provided with an additional narrow slot 180 that communicates with the innermost end of the slot 178 to facilitate spreading of the opposite sides of the slot 178.

From the foregoing, it will be apparent to those familiar with the art that the projection 176 provided with the slots 178 and 180 constitutes a combined guide and releasable lock means for the electric cord 112.

As thus far described, the operation of the preferred embodiment of the invention will be readily apparent. When the apparatus is assembled as shown in FIGURE 2, the electric cord 112 is wound upon the hub 70 with each turn of the electric cord 112 constituting a complete layer of the winding upon the hub 70. With such arrangement, a minimum axial reel dimension is realized, and in addition the winding and unwinding is such that there is no possibility of one turn of the cord becoming wedged or jammed between two or more closely spaced inner turns. Not only is a definite predetermined relationship established between rotation of the reel and the amount of cord extended therefrom that is substantially repeated exactly during repeated windings and unwindings, it should be noted that the amount of cord extension is effectively optimized or very large relative to angular rotation of the reel and reel hub diameter.

The optimization of cord extension relative to reel rotation for a given size reel hub enables the use of a spring motor 160 of the clock spring type of a strength such as to operate throughout the range of cord extension angularly displaced by a wide margin from its rest position, so that relatively minor percentage of torque variation occurs.

Since only a minor percentage variation in the diameter of the cord wound on the reel occurs (particularly during the first part of the extension) over a nearly constant spring torque, only a reasonably constant force is required to extend the cord from the winding device. This function is important when the end of the electric cord 112 including the conductors 114 and 116 remote from the housing is connected a device energized therethrough that is moved horizontally during use toward and away from the housing, with it is desired that no substantial variation in force presented by tension of the cord 112 is to occur. This function is also important when the apparatus 10 is to be used with the axis thereof in a horizontal position and an object suspended by and energized through the electric cord 112. The weight of such a supported object can be, together with the weight of the cord 112 outside the housing, such as to approximately balance the winding force, it being noted in this connection that only a very small force need be applied to the electric cord 112 by the projection 176 when the latter is used as a lock.

The ease with which the apparatus 10 is assembled and the spring motor tension adjusted will be manifest upon inspection of FIGURES 1 and 2. One of the possible assembly sequences comprises positioning the bolt 44 in the tubular portion 22 and the placement of the contactor rings 52 and 54 on the tubular portion 22 followed by connection of the conductors 60 and 62 to such rings. The spring motor 160 is then secured to the tubular portion 22 by the screw 162. The female socket device 120 is assembled and secured to the reel construction by the screws 122, after which the reel construction is positioned on the tubular portion 22 in such a manner that the pin 166 extends through the loop 164 of the spring motor 160, and so that the resilient contactor fingers 144 and 146 are in engagement with the external surfaces of the contactor rings 54 and 52.

The bolt 44 is then positioned in the assembled position thereof in the tubular portion 22 and such components retained in assembled relation by placing the split ring spring 82 on the bolt 44. The plug 106 can be plugged into the female socket 120 and the cord 112 allowed to drop into the space between the flanges 90 and 92 through the slot 150. The housing section 116 is then dropped onto the bolt 44 with the latter extending through the opening 26, care being taken that the projection 176 be dropped over the electric cord 112. The housing section 16 can then be rotated relative to the housing section 14 (care being taken to retain the cord 112 in the opening 174 and the projection 176) to tension the spring motor 160 and cause the cord 112 to be fully wound on the reel construction to any desired degree of torque, it being understood the electric cord 112 is either of such length that it cannot be received in its entirety within the housing, or otherwise provided with an enlargement at its end, not shown, such as to prevent the end of the cord 112 from passing into the housing. After the housing section 16 has been rotated relative to the housing section 14 to the extent desired, nut 46 is tightened on the bolt 44 to clamp the housing section 16 in fixed angular relation with respect to the housing section 14. In order that such fixed angular relationship be maintained so long as the nut 46 is tightened, lock washer, not shown, can if desired as mentioned previously be interposed between the nut 46 and the end wall 24 about the bolt 44. As will be evident on inspection of the drawings, an annular boss 186 is formed integrally with the end wall 24 about the opening 26, and such boss 186 seats against the upper surface of the split ring spring 82, whereby the above described tightening of the nut 46 retains the apparatus 10 in assembled relationship.

In view of the foregoing it will be clear that the spring tension is extremely easy to adjust without disassembly being required, whereby adjustment to changing environment or as demanded by weakening of the spring can be readily accomplished by unskilled persons and without special tools.

Combined means are provided for protecting the cable 56 adjacent the position from which it emerges from the opening 20 and for releasably supporting the apparatus 10 upon a suitable support, such as an ironing board, not shown. Such combined means comprises a metallic E-shaped member comprised of a web 194, an upper flange 196, an intermediate flange 198, and a lower flange 200. The upper flange 196 is secured to the end wall 18 by screws 202 and 204 so as to constitute a cover for the opening 20, the arrangement being such as to prevent ingress of foreign matter into the apparatus 10. An opening in the flange 196 provided with a rubber grommet 208 is disposed in the upper flange 196 through which the electric supply cable 56 extends: If desired, the portion of the electric supply cable 56 disposed within the tubular portion 22 can be knotted (not shown) to relieve any strain on the conductors 60 and 62 within the apparatus 10. The electric supply cable 56 extends from within the aparatus 10 through the grommet 208 into the space between the flanges 196 and 198 so as to be protected by the flange 198 adjacent the apparatus 10.

A screw hand clamp 210 is threaded through an opening extending through an enlarged portion 212 of the flange 200, the arrangement being such that the inner end 214 of the screw clamp 210 will coact with the intermediate flange 198 to clamp suitable support such as an ironing board therebetween. Preferably, the web 194, the flanges 196, 198 and 200, and the screw clamp 210 are of metal such as steel. If desired, the electric supply cable 56 can extend laterally from the E-shaped member, or if desired the same can be extended through an opening and grommet, not shown, in the web 194 intermediate the flanges 196 and 198.

From the foregoing, it is believed that the structure, materials and mode of manufacture of the apparatus 10 will be evident to those skilled in the art. It will be equally evident that the preferred embodiment of the invention is susceptible to numerous modifications and variations without departing from the spirit of the invention. For example, while the projection 176 is shown as extending radially from the housing section 16, it will be quite plain that the same can be inclined upwardly, downwardly or at any angle horizontally approaching tangency to the flange 28, as may be desired. It is believed that such a change is well within the skill of the art. Similarly, the relative diameters of the end walls 24 and 18 can be such that the flanges 28 and 30 are in direct opposition so as to abut when the apparatus 10 is assembled, or if desired the end wall 18 can be of greater diameter than the end wall 24 so that the flange 28 is received within the flange 30.

In view of the many variations and modifications of which the preferred embodiment of the invention is susceptible, some of which are suggested in the preceding paragraph, attention is directed to the appended claims in order to ascertain the actual scope of the invention.

I claim:

1. An electric cord reel comprising a reel mounted for rotation on a frame, said reel including a hollow hub provided with spaced radially extending flanges, an electric cord having one end thereof wound upon said hub as a radially extending spiral between the flanges, a first set of electric terminals insulated from each other and carried by the hub with said electric cord including an equal number of electric conductors insulated from each other, a single electric male plug and female socket means releasably connecting mechanically and electrically each one of the first set of terminals to separate ones of the electric conductors, whereby all of the electric conductors can jointly be mechanically and electrically released from the first set of terminals to free the electric cord from the hub of the reel, a second set of electric terminals carried by the frame and insulated from each other and equal in number to the first set of terminals, and means including a rotary electrical coupler having sliding contacts electrically connecting each one of the second set of terminals to separate ones of the first set of terminals, said contacts of the coupled being disposed within the hub and directly radially inward of said wound end of the cord whereby electrical energy supplied to the second set of terminals is delivered to the electric conductors of the electric cord when such conductors are electrically connected to the first set of terminals by said plug and socket means.

2. The combination of claim 1, wherein said frame includes a housing for said reel, said housing having an opening therein through which said electric cord extends, a spring motor in said housing connecting the latter and the reel and biasing rotation of the reel to wind the electric cord on the latter and thereby withdraw the portion of the electric cord extending from the housing into the latter through the opening, and means for releasably preventing retraction of the electric cord comprising said housing having a projection adjacent said opening that extends outwardly from the housing in a direction generally parallel to the direction that the electric cord extends from the housing, with the end of the projection having a slot therein snugly and releasably receiving the electric cord therein.

3. In an electric cord reel construction, the improvement comprising a housing including separable first and second sections, said first section comprising a substantially circular first wall having a central opening, said second section comprising a substantially circular second wall spaced parallel to the first wall, said walls having peripheral flanges directed generally toward each other to define jointly with said walls a substantially cylindrical hollow interior of the housing, said first wall having a re-entrant, generally tubular portion about the opening and extending into the housing, means coaxial with the tubular portion of the first wall and the second wall releasably connecting such tubular portion and the second wall to releasably secure the walls in assembled relation, a reel in the housing and rotatably mounted on the tubular portion for rotation about an axis coincident with the axis of said tubular portion, said reel including a hollow hub, a pair of electric contactor rings insulated from each other disposed within the hollow hub and mounted on the tubular portion of the first wall, a pair of insulated electric conductors projecting into said opening from outside the housing and connected to the contactor rings, a pair of electric contactor fingers disposed within the hollow hub and carried by the reel in sliding electrical engagement with the rings, an electric cord wound on the reel having a pair of insulated electric conductors therein, means electrically connecting the last-mentioned conductors to the fingers, said housing having an opening jointly defined between said flanges through which the electric cord extends from the housing, and a spiral spring motor wound about the tubular portion of the first wall intermediate the reel and the first wall and operatively biasing rotation of the reel relative to the housing to urge winding of the electric cord about the reel.

4. The combination of claim 3, wherein said last recited means comprises a releasable electric female socket and male plug means.

5. The combination of claim 3, wherein one of said flanges is provided with a projection adjacent the opening through which the electric cord extends, said projection having a slot therein snugly and removably receiving the electric cord therein whereby the cord can be selectively prevented from being retracted into the housing and wound upon the reel.

6. The combination of claim 3, wherein said means for releasably securing the walls in assembled relation comprises said tubular portion of the first wall having an internal shoulder, said second wall having a central opening, and nut and bolt means coaxial with the tubular portion acting against said shoulder and the second wall to urge the walls together, with means being provided to limit the movement of the walls toward each other.

7. The combination of claim 6, wherein the bolt has a polygonal shank portion nonrotatably received in the tubular portion of the first wall, and the nut is threaded on the bolt and in engagement with the second wall.

8. The combination of claim 6, wherein the substantially annular extremity of one of the flanges is received within the substantially annular extremity of the other flange.

References Cited

UNITED STATES PATENTS

| | | | |
|---|---|---|---|
| 1,863,341 | 6/1932 | Jensen | 191—12 |
| 1,944,264 | 1/1934 | Oravec et al. | |
| 2,016,441 | 10/1935 | Kelley | 191—12 |
| 2,270,997 | 1/1942 | Davis | 191—12 |
| 2,348,966 | 5/1044 | Dow et al. | 191—12 XR |
| 2,719,702 | 10/1955 | Brace | 191—12 XR |
| 2,801,303 | 7/1957 | Pailing | 191—12 |
| 3,106,366 | 10/1963 | Bernard | 191—12 XR |
| 3,167,161 | 1/1965 | Appelton | 191—12 |
| 3,182,139 | 5/1965 | Meletti | 191—12 |

FOREIGN PATENTS

| | | |
|---|---|---|
| 569,088 | 1/1924 | France. |
| 657,150 | 1/1929 | France. |
| 1,217,563 | 12/1959 | France. |

EUGENE G. BOTZ, Primary Examiner.

STANLEY T. KRAWCZEWICZ, Examiner.